United States Patent Office 3,751,541
Patented Aug. 7, 1973

3,751,541
PROCESS OF FORMING PLASTIC TUBING WHICH IS PARTIALLY CORRUGATED
Wilhelm Hegler, 8731 Oerlenbach, Germany
Continuation-in-part of abandoned application Ser. No. 779,117, Nov. 26, 1968. This application Mar. 24, 1971, Ser. No. 127,757
Claims priority, application Germany, Nov. 29, 1967, P 17 04 715.3
Int. Cl. B29c 17/07, 17/14
U.S. Cl. 264—90    10 Claims

ABSTRACT OF THE DISCLOSURE

Continuous formation of partially transversely corrugated plastic tubing by extruding a tube of thermoplastic material; passing the tubing, while still in thermoplastic forming condition, through a mating mold half assembly in which each set of mold halves are connected together in an endless fashion and wherein some of the mating mold halves have transverse corrugation molding means therein and some of the mating mold halves are smooth insofar as their molding surfaces are concerned; closing the mold halves about said tubing; simultaneously conveying the endless mold half assemblies and the endless thermoplastic tubing in molding relation to each other at the same rate along a mold path; applying a vacuum to the outside of said thermoplastic tubing along said mold path through said mold halves thereby drawing said thermoplastic tubing against the smooth molding surfaces of the smooth mold halves and into the transverse corrugated molding surfaces of the corrugated mold halves; and opening said mold halves from about said tubing after said tubing has cooled to below its thermoplastic forming temperature.

---

This application is a continuation-in-part of application Ser. No. 779,117, filed Nov. 26, 1968, now abandoned.

This application relates to the manufacture of plastic tubing. It more particularly refers to the continuous manufacture of small diameter thermoplastic tubing which is partially transversely corrugated.

It is well known that various thermoplastic materials can be extruded directly in tubular shape and that these tubes can be expanded, and even biaxially oriented, by means of internal gas pressure forced into the inside of the extruded tube through an appropriate nozzle or tube in the extruder mouth. It is also known that thermoplastic tubing is still in the thermo-forming condition as it issues from the die lips of an extruder as well as for some finite distance therefrom while it cools down to ambient temperature, presumably below thermo-forming temperature.

It is in the prior art to subject extruded thermoplastic tubing while still in the thermo-forming stage to additional molding action of apparatus donwstream of the extruder. Thus, it is known to pass the thermoformable plastic tubing through appropriate molding means so as to form transverse corrugations in the plastic tubing. In this process the thermoplastic tubing is either forced into the corrugated molding means by internal pressure, in which case batch operation is usually used because the free end of the tube must be closed in order to hold the pressure, or is sucked into the corrugated molding means by externally applied vacuum.

Applicant's Dutch Pat. No. 261,944 discloses a technique for continuously producing a fully transversely corrugated thermoplastic tubing by passing an extruded smooth walled tubing through a continually recirculating mold half pair assembly. It should be noted that the corrugated tubing which emerges from the molding apparatus has a lower linear speed than the smooth walled tubing which is being extruded directly into the molding means. This is because of the corrugations being molded into the tubing. It should also be noted that the smooth walled tubing is forced into the corrugated molding means by suction applied from outside through the molding means.

Close consideration of the operation of Dutch Pat. No. 261,944 will reveal that air being sucked off through the corrugated molds forms a cushion or barrier between the inside edges of the corrugated mold halves and the outside of the extruded smooth walled tube so that the tubing is sucked into the transverse molding corrugations without sliding across the next succeeding inside edge of the molding means. Thus, it is clear that the mold halves must have a linear speed which is lower than the extrusion speed of the thermoplastic tubing by an amount equal to the shortening of the tubing because of the corrugations.

In contrast to this procedure for producing fully corrugated tubes, the production of smooth tubes using analogous apparatus and procedure could not employ tubular extrusion of plastic at a faster rate or linear speed than the linear speed of the molding means because this would cause the molding means to hold up the extruded tubing in an obviously unsatisfactory manner. Further, the use of suction to draw the extruded tubing to the mold half sections is not suitable because the holes through which the suction is applied would be closed immediately as the tube is drawn out, probably before suction could be applied to the next upstream holes. Thus, smooth walled tubing is preferably produced with the assistance of internal pressure rather than external vacuum and with extrusion linear speed and molding means linear speed matched and synchronized as closely as possible to one another.

The problem to which the instant invention is directed is to produce a thermoplastic tubing, preferably a thin thermoplastic tubing, in a continuous manner while imparting transverse corrugations to only a portion of the plastic tubing, albeit a repeating spaced portion of the tubing. It can be seen from considering this problem that the solution would appear to lie in using a very short molding path and running it at different linear velocities depending upon whether a corrugated or a smooth section is being produced. Clearly this type of operation would be very difficult if not impossible to carry out on a continuous basis particularly in a commercial operation.

On the other hand, if one could use a process in which internal overpressure applies the driving force to insert the extruded tubing into the transverse corrugated molding means, it would be obviously possible to operate the molding means at a constant speed synchronized with the extrusion speed because in this operation there is no sucked out air acting as a cushion between the tubing and the next upstream corrugation inside edge. Operating such a process or apparatus with internal overpressure causes other difficulties, particularly the difficulty of stopping the open end of the tubing being continuously extruded to retain the overpressure necessary to force the tubing into the corrugated molding means.

To the above described cumulative difficulties encountered when using an internal overpressure type of operation, is added the fact that what is desired as a final product is drinking straws of finite length which are mostly smooth walled but have a limited length transversely corrugated "articulatable joint" portion, and the complications in maintaining the required internal overpressure are compounded by the continual intermittent cutting operation required to produce the final desired multiplicity of straws. On balance, the relative disadvantages of using internal overpressure as opposed to external vacuum in the continuous process of producing thermoplastic tubing result in the selection of the external vacuum type of operation as the least undesirable.

It has now surprisingly been found that it is possible, contrary to the expectations of the prior art, to modify the process disclosed in Dutch Pat. 261,944 in a simple and straightforward manner so as to continuously produce plastic tubing having intermittent smooth and intermittent transversely corrugated sections.

It is, therefore, an object of this invention to provide a novel process of producing thermoplastic tubing.

It is another object of this invention to provide a novel process of producing partially transversely corrugated plastic tubing.

It is a further object of this invention to provide a novel process for continuously producing thermoplastic drinking straws having at least one articulatable, transversely corrugated joint.

Other and additional objects of this invention will become apparent from a consideration of this entire specification including the drawing and the claims hereof.

In accord with and fulfilling these objects, one aspect of this invention resides in a novel process comprising extruding a tube of thermoplastic material, preferably a rather thin tube of up to about 10 mm. diameter, by conventional tubular extrusion techniques; passing the extruded tubing while such is still in a thermo-forming condition along a molding path; providing two endless interconnected series of mold halves oppositely disposed about said mold path, wherein an equal number less than all of said mold halves in each of said series as mold halves have corrugated recesses transverse to said mold path; synchronously moving said extruded thermoplastic tube and said mold half series in the same direction along said mold path; closing a mold half pair about said extruded tubing at a point on said mold path close to said extruding step; maintaining said mold half pair closed about said tubing in a thermo-forming relationship for a time sufficient to mold said tubing to the contours of said mold pair; drawing a suction on the outside of said tubing through said mold half pair during said thermo-forming; cooling said tubing during said mold forming thereof; and opening said mold half pair remote from said extruding step after said tubing has cooled to a temperature below the minimum thermo-forming temperature thereof; wherein said suction causes said tubing to conform to said molds in a sequential manner from the downstream end of each mold toward the upstream end of each mold while maintaining aspirated air as a cushion between the tube and those parts of the mold which it has not as yet contacted.

It is most unexpected and surprising that the mold half series can be operated at the same linear speed as the tubular linear extrusion rate and that the tubing actually adjusts its linear speed to the type of mold half which it contacts. Thus, at the point where smooth walled mold sections convert to corrugated mold sections, that is at the initial deformation spot, and for the duration of the corrugated mold portion of the entire mold train series, the instantaneous linear speed of the thermoplastic tubing is indeed higher than the linear speed of the mold pairs. Thus, the thermoplastic tubing is capable of conforming to the serpentine longitudinal cross section of the corrugated molds. Upon smooth mold sections coming into play, the thermoplastic tubing can revert to an instantaneous linear velocity which is equivalent to the linear velocity of the mold half pairs.

While the carrying out of operations as described above with relatively large diameter thermoplastic tubing is difficult enough to make such operations inefficient at best, when the tubing is reduced in diameter to less than about 10 mm., preferably 3 to 7 mm., the cooling rate of the tubing is so rapid that extrusion of the tube must take place directly into the mold path and directly into the jaws of the upstream-most closing mold half pairs so that sufficient thermoplasticity remains to permit adequate shaping of the tubing to the mold contours. The increasingly small tube diameter also increases the molding and extruding difficulties particularly where the product being produced is partially corrugated and partially smooth, is produced in a continuous line and is cut into finite lengths.

Apparatus for use in the process of this invention is shown in the drawing in which:

FIG. 1 is a diagrammatic representation of of a top view of a circulating train of molds.

FIG. 2 also is a diagrammatic view of the inside surface of one of the two halves of a mold member.

Figure 1:
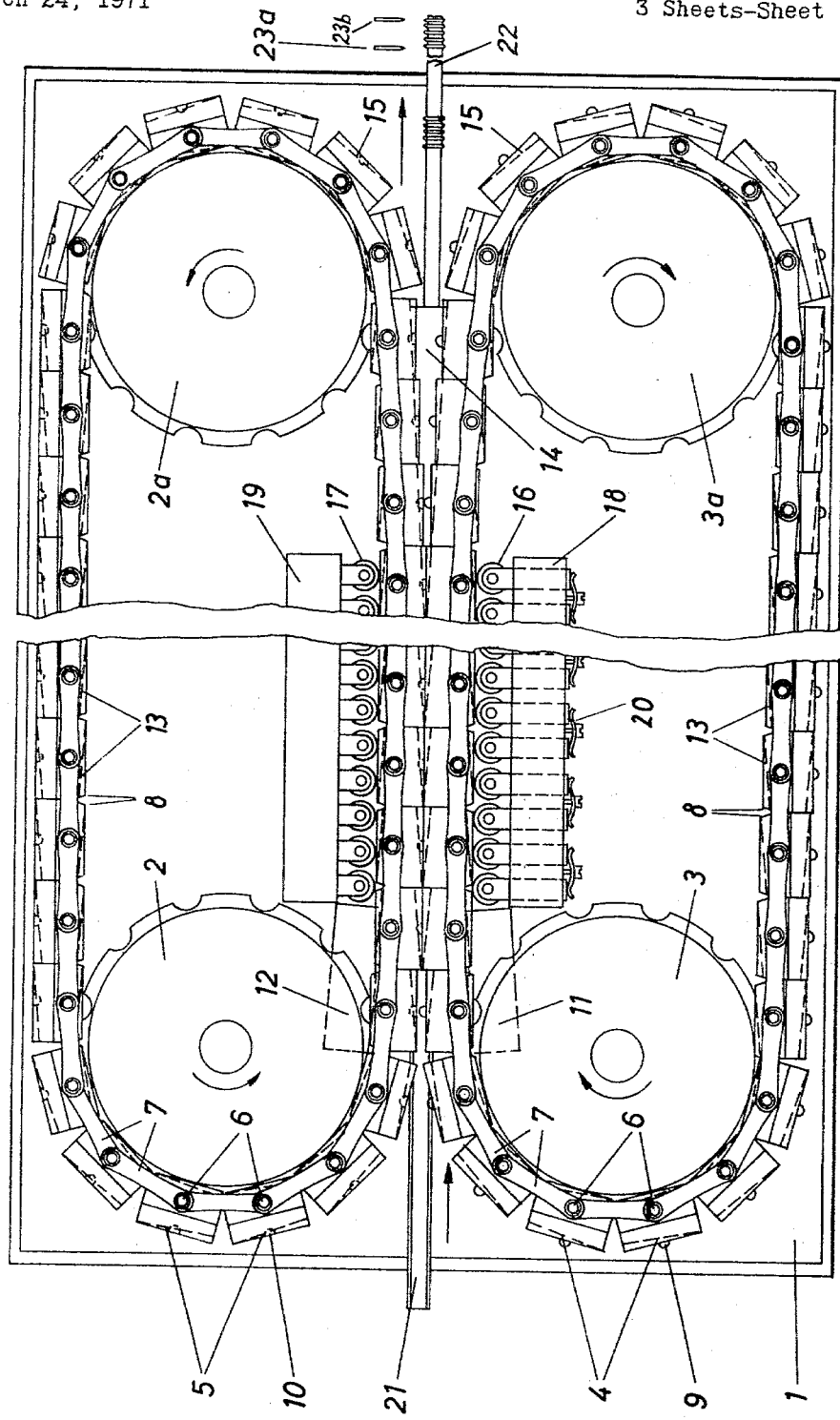

According to FIG. 1, the drive sprockets 2 and 3 which are disposed on the base plate 1 and rotate in opposite directions, drive a plurality of concatenated mold halves 4 and 5 which come together on the central axis of the base plate to form closed molds for the creation of a seamless tube. After the mold halves open to release the finished tube, they are returned around wheels 2a and 3a so as to be cooled and ready again for the continuous forming process. To enable the mold halves to be driven by the sprockets, they are provided with pins 6 passing through them centrally, which engage the sprockets, and the links 7 on the top and bottom sides join the mold halves end to end. Chambers 8 of the inside edges of the mold halves permit smooth circulation around the sprockets. The rounded protuberances 9 engage in the associated sockets 10 to assure the positive alignment of the mold halves.

On the input end, the ramp members 11 and 12 serve to keep the closing mold halves parallel, the mold halves being equipped, for this purpose, with ramps 13 facing the inside of the circulatory path of the mold halves. On the output end, a ramp member 14 is provided, which in turn assures parallelism between the mold halves as they open, the latter being provided for this purpose with a second ramp 15 located on the outside of the circulatory path of the mold halves. Rollers 16 and 17 mounted on bridges 18 and 19 hold the mold halves tightly closed along the actual working length, between the point at which the mold halves close and the point at which they reopen, rollers 17 being mounted fixedly and rollers 16 being urged against them by a system of springs 20 to provide for uniform contact pressure between the mold halves. The input mandrel 21 is fastened to the die of the plastic extruding machine and introduces the smooth plastic tube emerging from the extruder into the apparatus. The finished plastic tube 22 emerging from the other end of the apparatus can be severed into individual lengths by a cutting system 23a–23b.

Figure 2A:
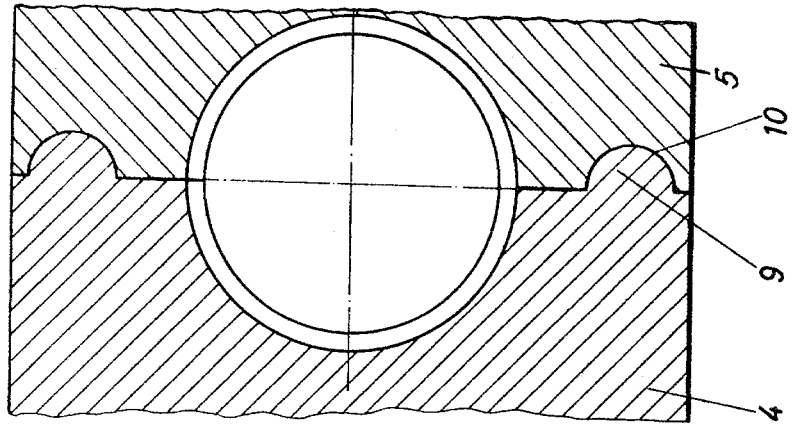
FIG. 2a is a transverse section through a pair of mold halves in mating relation.
Figure 2:
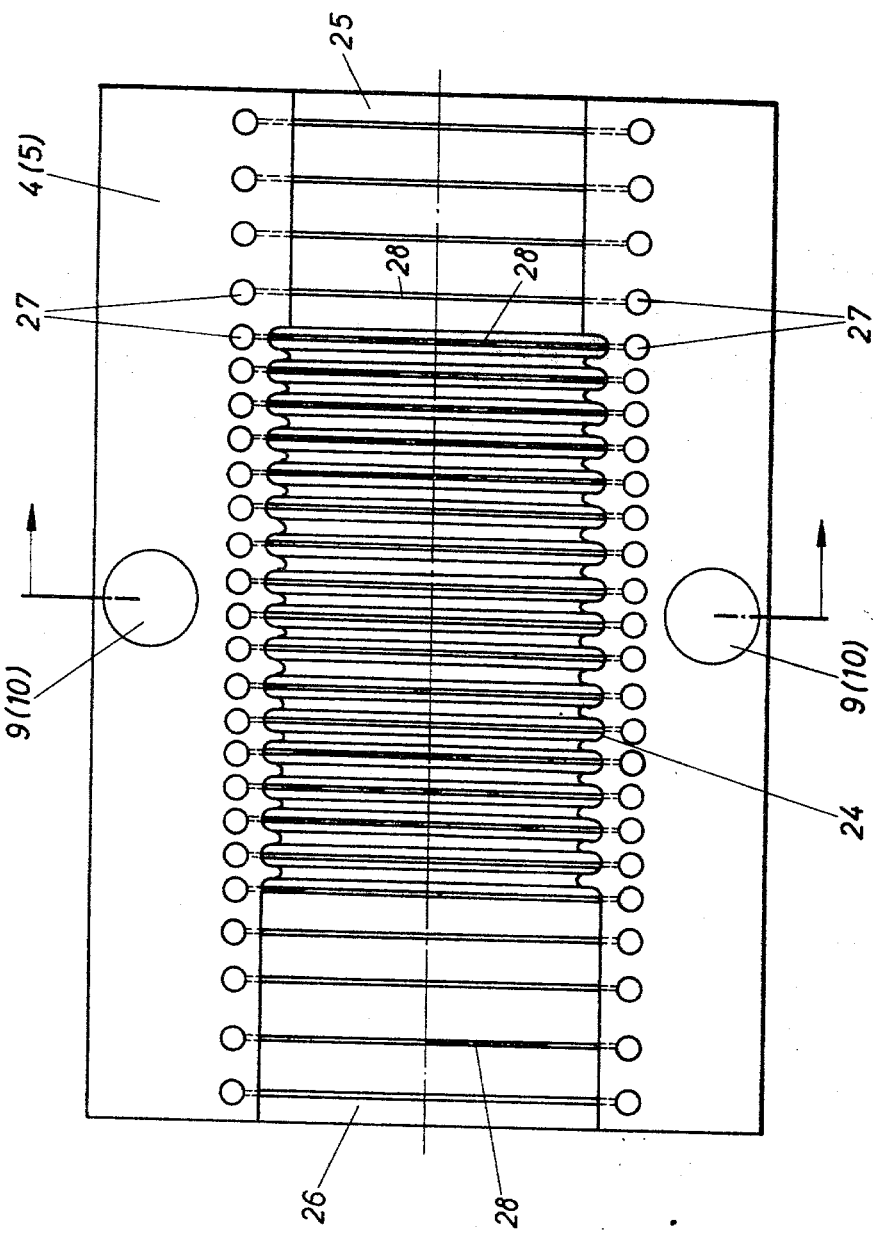

The bipartite molds formed by mold halves 4 and 5 have different inside shapes, one of a series of molds having an inside shape corresponding to plain sections or tubing being followed by at least one mold having the inside shape of a section of tubing that has a series of successive annular corrugations on at least a portion of its length. The inside shape of a mold of the latter type is represented in FIG. 2. The mold half 4 or 5, which is represented in FIG. 2, has three different inside sections along its length. In the middle portion it has a shape corresponding to a tube having a series of successive annular corrugations, whereas the two end portions have an inside shape corresponding to plain sections of tubing; section 25 at the one end has an inside shape whose diameter is equal to the minimum diameter of the section having the corrugations, while the section at the other end has an inside shape whose diameter is equal to the maximum diameter of the sections having the corrugations. Vacuum passages 27 are provided in the walls of the mold halves 4 and 5. In the bottom of each annular groove in the corrugated section of the mold and in the inner walls of the plain sections slits 28 are cut, which lead into the passages 27. These slits extend continuously around the entire circumference of the inside of the mold.

When the plastic tube emerging from the extruder contacts the inside surface of the mold, the air is sucked out of the mold through slits 28 and passages 27, and thus the plastic tube is shaped precisely to the inside form of the mold.

Figure 3:
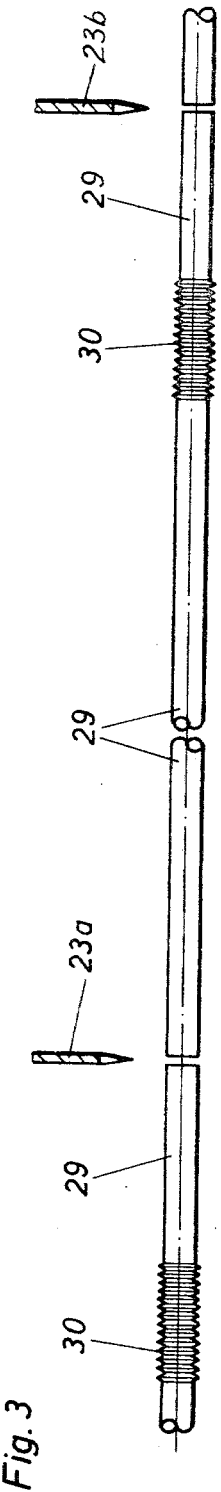
FIG. 3 is a longitudinal view of a tube designed for use as a drinking straw.

The FIG. 3 represents a tube produced by means of the apparatus according to the invention, this tube being designed as a drinking straw. In the apparatus for the manufacture of such a drinking straw, a number of molds having an inside shape corresponding to plain section of tubing 29 is followed by one mold having the inside shape corresponding to a section 30 which has annular corrugations along a portion of its length. The cutting off of the straws is performed by the previously mentioned cutting system 23a and 23b, and the tubes are severed in such a manner that the corrugated section of the straw is located closer to one end of the straw, as can be seen in FIG. 3. In order to assure the continuity of the manufacturing process along with trouble-free operation of the cutting system 23a–23d, it is necessary for the total length of the train of molds to be an even multiple of the length of the drinking straw being produced.

The drinking straws manufactured by the apparatus of the invention are not more expensive than the plain straws of the prior art, but they have the great advantage of being flexible at one end, and can, therefore, be used wherever the user is unable to tilt his head, as in the case of bed patients in hospitals, for example, or finds it undesirable to do so, as in the case of a television viewer.

The apparatus according to the invention makes it possible to manufacture these desirable drinking straws in a single operation, a thing which has been impossible in the prior art methods of making such straws.

Figure 4:
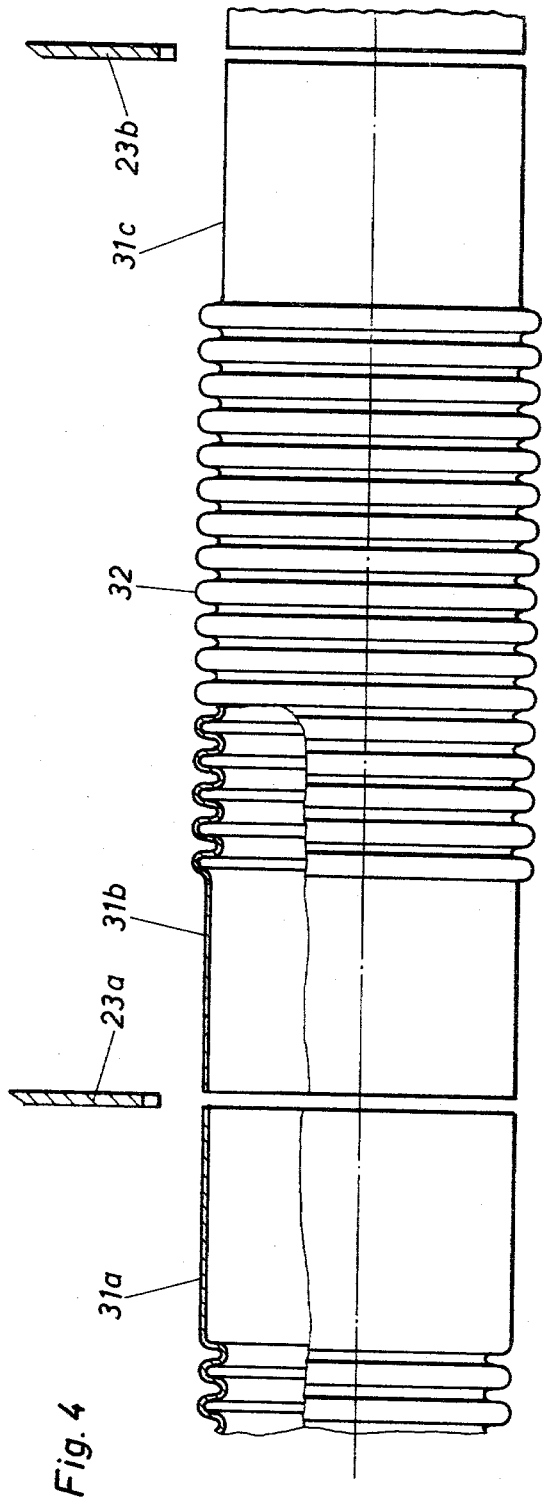
FIG. 4 shows a partially cut-away longitudinal view of a tube which is designed mainly for use in air-conditioning and ventilating systems.

The tube represented in FIG. 4, and made by means of the apparatus of the invention, has a considerably greater greater diameter than the tube of FIG. 3. In this case, one or more plain molds corresponding to plain pipe sections 31a, b, c, are followed by a mold having the inside shape corresponding to a pipe section 32 having corrugations on a portion of its length. The cutting system 32a, b, again serves for severing the lengths of pipe. To achieve continuous performance of the manufacturing process it is again necessary that the total length of the train of molds be a full multiple of the length of the tube or pipe being manufactured.

As previously mentioned, and as it is also apparent from FIG. 4, the molds for the production of the plain sections of tubing may have different inside diameters. In this way it is possible for the plain sections to join the corrugated sections either at the peak or at the valley of the corrugation. In this manner the plain sections 31a and 31c can have different outside diameters, which can be advantageous if the pipes are to be joined together by plugging them into one another. It is possible, of course, also to design the mold so that the plain section 31b will meet the corrugated section at a point midway between the peaks and valleys. Furthermore, for special purposes it is possible to use molds having the inside shape of bells with spigots etc. It is also possible to design the mold so that the diameter of the plain sections is considerably smaller than the minimum diameter of the corrugated section; it is merely necessary to assure that the original diameter of the hot plastic tube being formed is smaller than the smallest diameter of the finished tube.

The plastic tubes manufactured according to FIG. 4 by means of the apparatus according to the invention can be used with great advantage in air-conditioning and ventilating systems. For example, in automobile manufacture, the customary laminated paper and aluminum ventilation tubes are increasingly being replaced with corrugated plastic tubes, now that heat-resistant plastics are being offered at low prices. For the easier assembly of these tubes it is desirable that the tubes have at their extremities plain ends with diameters that are different under some circumstances. It is easily apparent that such tubes can be manufactured rapidly and simply with the apparatus according to the invention, in only one step.

What is claimed is:

1. In the process of producing thermoplastic tubing of predetermined cross section by extending tubing of thermoplastic material; passing said tubing while still in the thermoplastic state along a mold path; closing said tubing in molding means at the upstream end of said mold path; maintaining said tubing in said closed molding means for at least the time that said tubing is in the thermoplastic state; applying a vacuum to the outside of said tubing along said mold path through said molding means to conform said tubing to the contours thereof while the inside of said tubing is substantially open to ambient conditions; cooling said tubing within said molding means and then opening said molding means after said tubing has been conformed to the contours thereof and has cooled to below its minimum thermo-forming temperature; the improvement which comprises utilizing as said molding means two continuous cyclical series of mold halves each of which is articulatably attached to the mold half immediately preceding and immediately succeeding such, each of which mold half series being disposed on opposite sides of said mold path, some but less than all of said mold halves having smooth inner molding walls and the remainder having transversely corrugated inner molding walls; moving said tubing and said mold halves along said mold path at substantially the same speed; and cutting the resultant partially corrugated continuous tubing into sections of finite length having a transversely corrugated portion and the remainder smooth walled.

2. The improved process as claimed in claim 1, including providing the corrugated portion of said tubing in such location and so synchronized with said cutting step that said tubing of finite length has smooth walls adjacent the ends thereof and said corrugated portion therebetween.

3. The improved process claimed in claim 1, including providing said smooth-walled mold half pairs of a diameter equivalent to the inside diameter of said corrugated mold half pairs.

4. The improved process claimed in claim 1, including providing said smooth-walled mold half pairs of a diameter equivalent to the outside diameter of said corrugated mold half pairs.

5. The improved process claimed in claim 1, wherein some of said smooth-walled mold half pairs have a diameter equivalent to the inside diameter of said corrugated mold half pairs and the remainder of said smooth-walled mold half pairs have a diameter equivalent to the outside diameter of said corrugated mold half pairs, all of said smaller diameter smooth-walled mold half pairs being disposed on one side of one section of corrugated mold half pairs and all larger diameter smooth-walled mold half pairs being disposed on the opposite side of said corrugated mold half pairs.

6. In an apparatus for forming a thermoplastic tube comprising means for forming thermoplastic tube shaped material in a moldable condition, a pair of oppositely disposed mold half assemblies in surrounding relation to said plastic tube and spaced from said tube forming means, each assembly comprising a plurality of mold halves, means for moving the mold halves of said assemblies and said plastic tube in the same direction at substantially the same speed, means for forcing the mold halves toward each other about said plastic tube, means for impressing the shape of such mold halves onto said tube, and means for removing said molded tube from said molded halves, the improvement wherein some of said molded halves have corrugated molding surfaces and some of said mold halves have substantially smooth molded surfaces arranged in predetermined repeating position; wherein mold halves having corrugated surfaces are mating and vacuum means are associated with at least said corrugated mold halves to draw said tube into said mold halves and thereby corrugate such in predetermined locations; and wherein the inside of said tube is substantially open to ambient conditions.

7. Apparatus as claimed in claim 6, wherein said mold half assemblies comprise substantially endless linked mold halves.

8. Apparatus as claimed in claim 7 including cutting means adapted to cut said molded plastic tube.

9. Apparatus as claimed in claim 7, wherein some of said smooth mold half pairs have closed mold diameters equivalent to the inside diameter of said corrugations and other of said smooth mold half pairs have diameters equal to the outside diameter of said corrugations.

10. Apparatus as claimed in claim 7 wherein the mold half pairs are each maintained on an advance continuous means for moving the mold halves which means defines a mold train which mold train has a length corresponding to the length of the corrugated thermoplastic tube to be formed.

References Cited

FOREIGN PATENTS

| | | | |
|---|---|---|---|
| 3,430,292 | 3/1969 | Bauman et al. | 425—396 X |
| 3,474,162 | 10/1969 | Seckel | 425—326 X |
| 2,866,230 | 12/1958 | Holte | 425—370 X |
| 3,286,305 | 11/1966 | Seckel | 425—396 X |
| 3,538,209 | 11/1970 | Hegler | 264—99 X |

FOREIGN PATENTS 261,944   1964   Netherlands.

ROBERT F. WHITE, Primary Examiner

J. H. SILBAUGH, Assistant Examiner

U.S. Cl. X.R.

264—150, 151, 209, 210, 286; 425—296, 303